(12) United States Patent
Allen et al.

(10) Patent No.: US 8,473,455 B2
(45) Date of Patent: Jun. 25, 2013

(54) QUERY-ORIENTED MESSAGE CHARACTERIZATION

(75) Inventors: Nicholas A. Allen, Redmond, WA (US);
Stefan R. Batres, Sammamish, WA (US); Justin D. Brown, Seattle, WA (US); Jayteerth N. Katti, Redmond, WA (US); Stephen Maine, Seattle, WA (US); Edmund S. V. Pinto, Duvall, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 12/203,790

(22) Filed: Sep. 3, 2008

(65) Prior Publication Data

US 2010/0057707 A1    Mar. 4, 2010

(51) Int. Cl.
*G06F 17/00* (2006.01)
(52) U.S. Cl.
USPC .......................................... 707/613; 707/713
(58) Field of Classification Search
USPC .................................. 707/613, 713; 709/206
See application file for complete search history.

(56) References Cited

U.S. PATENT DOCUMENTS

| | | | |
|---|---|---|---|
| 5,892,923 A | 4/1999 | Yasuda | |
| 6,243,360 B1 | 6/2001 | Basilico | |
| 6,567,380 B1 | 5/2003 | Chen | |
| 6,732,273 B1 | 5/2004 | Byers | |
| 6,826,148 B1 | 11/2004 | Lee | |
| 7,039,050 B1 | 5/2006 | Mutreja | |
| 7,234,109 B2 * | 6/2007 | Atkinson | 715/239 |
| 7,774,831 B2 * | 8/2010 | Kuznetsov et al. | 726/12 |
| 7,809,698 B1 * | 10/2010 | Salz et al. | 707/694 |
| 7,899,871 B1 * | 3/2011 | Kumar et al. | 709/206 |
| 7,983,701 B2 * | 7/2011 | Bell et al. | 455/466 |
| 2002/0184344 A1 | 12/2002 | Elvanoglu | |
| 2004/0018839 A1 | 1/2004 | Andric | |
| 2004/0098667 A1 * | 5/2004 | Atkinson | 715/513 |
| 2004/0148334 A1 | 7/2004 | Arellano | |
| 2005/0044197 A1 * | 2/2005 | Lai | 709/223 |
| 2005/0108340 A1 | 5/2005 | Gleeson et al. | |
| 2005/0198169 A1 * | 9/2005 | Holten et al. | 709/206 |
| 2006/0029198 A1 | 2/2006 | Dorneich et al. | |

(Continued)

OTHER PUBLICATIONS

"Apache Synapse Enterprise Service Bus (ESB)," Author Unknown, Date Unknown, 1 pg. [online] [retreived on Jul. 28, 2008]. Retrieved from the Internet: http://synapse.apache.org/.

(Continued)

*Primary Examiner* — Thanh-Ha Dang
(74) *Attorney, Agent, or Firm* — Workman Nydegger

(57) ABSTRACT

Messages are processed based on a characteristic derived from information in messages, metadata about messages, or other information external to messages. Values for one or more pieces of information are received. At least one of the values for one or more pieces of information is associated with a first message. Queries are received. The queries specify one or more of the pieces of information. At least a portion of the plurality of values for the one or more pieces of information is processed in conjunction with the one or more queries to create one or more normalized characteristics for the first message. The one or more normalized characteristics for the first message are in a same format irrespective of the format of the pieces of information. The first message, and/or other messages, is processed based on at least one of the one or more normalized characteristics.

20 Claims, 4 Drawing Sheets

U.S. PATENT DOCUMENTS

| | | | |
|---|---|---|---|
| 2006/0041647 | A1 | 2/2006 | Perham et al. |
| 2006/0059165 | A1* | 3/2006 | Bosloy et al. .................... 707/10 |
| 2006/0085505 | A1 | 4/2006 | Gillum et al. |
| 2006/0089931 | A1* | 4/2006 | Giacobbe et al. ................. 707/9 |
| 2006/0123467 | A1 | 6/2006 | Kumar |
| 2006/0123479 | A1 | 6/2006 | Kumar et al. |
| 2006/0129650 | A1 | 6/2006 | Ho |
| 2006/0149767 | A1* | 7/2006 | Kindsvogel et al. ........... 707/101 |
| 2006/0173899 | A1* | 8/2006 | Balayoghan et al. ......... 707/102 |
| 2006/0215660 | A1 | 9/2006 | Vigoureux |
| 2006/0242292 | A1 | 10/2006 | Carter |
| 2006/0265689 | A1* | 11/2006 | Kuznetsov et al. ........... 717/117 |
| 2007/0011256 | A1* | 1/2007 | Klein ............................ 709/206 |
| 2007/0064702 | A1 | 3/2007 | Bates |
| 2007/0064703 | A1 | 3/2007 | Hernandez et al. |
| 2007/0168546 | A1 | 7/2007 | Greeff |
| 2007/0276956 | A1 | 11/2007 | Dorai |
| 2008/0168150 | A1* | 7/2008 | Chen et al. .................... 709/206 |
| 2008/0178197 | A1* | 7/2008 | Pape et al. ..................... 719/318 |
| 2008/0291030 | A1* | 11/2008 | Pape et al. ................... 340/573.3 |
| 2009/0234924 | A1* | 9/2009 | Edelen et al. ................. 709/206 |
| 2010/0030798 | A1* | 2/2010 | Kumar et al. .................. 707/102 |
| 2010/0037161 | A1* | 2/2010 | Stading et al. ................ 715/764 |
| 2010/0057933 | A1 | 3/2010 | Allen |

OTHER PUBLICATIONS

"Constraint-Based Personalization Model: Multi-Channel Messaging," by Kal Toth and Sai Rajkiran Nagboth, Department of Computer Science, Oregon State University, Date Unknown, 5 pgs. [online] [retreived on Jul. 28, 2008]. Retrieved from the Internet: http://www.research.att.com/~rjana/TothNagboth.pdf.

"Demaq: A Foundation for Declarative XML Message Processing," by Alexander Bohm, Carl-Christian Kanne and Guido Moerkotte, Department of Mathematics and Computer Science, Universityof Mannheim, Germany, Date Unknown, 11 pgs. [online] [retreived on Jul. 28, 2008]. Retrieved from the Internet: http://www.cidrdb.org/cidr2007/papers/cidr07p04.pdf.

"Cisco AON: A Network-Based Intelligent Message Routing System," Author Unknown, Cisco Application Networking Services Modules, Copyright 1992-2008 Cisco Systems, Inc., 8 pgs. [online] [retrieved on Jul. 25, 2008]. Retrieved from the Internet: http://www.cisco.com/en/US/prod/collateral/modules/ps6438/product_data_sheet0900aecd802c1f9c.html.

"Sonic ESB B5.5 Developer's Guide," Author Unknown, Sonic Software Corporation, Copyright 2004, 422 pages, [online] [retreived on Jul. 25, 2008]. Retrieved from the Internet: http://www.sonicsoftware.com/developer/documentation/docs/esb_dev.pdf.

Andrew T. Campbell, et al., "Design, Implementation and Evaluation of Cellular IP," IEEE Personal Communications, vol. 7, Issue: 4, pp. 42-49, Publication Year: 2000. See pp. 44-45.

Antonio Carzaniga et al. "A Routing Scheme for Content-Based Networking" INFOCOM 2004. Twenty-third Annual Joint Conference of the IEEE Computer and Communications Societies Issue Date: Mar. 7-11, 2004 on pp. 918-928 vol. 2.

U.S. Appl. No. 12/203,826, Apr. 27, 2011, Office Action.

Notice of Allowance cited in U.S. Appl. No. 12/203,826 dated Sep. 20, 2011.

* cited by examiner

QUERY-ORIENTED MESSAGE CHARACTERIZATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data messages from other computing system.

In a message-processing application it is not uncommon for a stage of processing to require only a portion of the message as input when making a decision. An example of such a decision is message routing, which may be based on a single field or portion of the message as opposed to the entire message payload. Furthermore, the decision may only need a characterization of the message rather than the literal content. In the context of the message routing example, the routing decision may only require an equitable but repeatable distribution of messages. In other words, two messages with the same characteristic have the same routing applied but messages with different characteristics should be apportioned equally among the routing targets. Using a characteristic for message routing may be used in a fashion analogous to using a hash code for lookup in a table.

There are a variety of information sources that may be drawn upon to compute a characteristic. It is typical for a message to be segmented into several component parts, such as a message envelope, message body, and message headers. The message transmission protocol contributes information, such as HTTP headers, SMTP headers, TCP socket properties, and so on depending on the protocols in use. Moreover, a variety of other protocols that contribute information may be used in connection with the message as well, such as SSL session keys and WS-ReliableMessaging sequence identifiers. Both the quantities and kinds of information that might be used to form the characteristic are virtually limitless so an attempt to produce a complete enumeration may be a somewhat futile task.

Additionally, the time at which the information needed to compute the characteristic becomes available varies. These variations take place not only from information source to information source but from fact to fact within an information source. As an extreme example, some information may not be known until a message is sent. Due to the highly concurrent nature of a distributed system, it is conceivable that the message might be received by another party, processed, and a response sent back before the calculation of the characteristic for sending the original message completes. The application needs to be able to handle these difficult race conditions.

Previous solutions have had multiple storage locations for the different classes of information that might be used to construct a message characteristic. Due to the variety of access methods for these storage locations and timings for the availability of information, the construction of a characteristic has largely been a manual and ad hoc process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein are directed to processing messages using a characteristic. Messages are processed based on a characteristic derived from at least one of: information in messages, metadata about messages, or other information external to messages. One or more values for one or more pieces of information are received. At least one of the values for the one or more pieces of information is associated with a first message. One or more queries are received. The queries specify one or more of the one or more pieces of information. At least a portion of the plurality of values for the one or more pieces of information are processed in conjunction with the one or more queries to create one or more normalized characteristics for the first message. The one or more normalized characteristics for the first message are in a same format irrespective of the format of the pieces of information. The first message, and/or other messages, are processed based on at least one of the one or more normalized characteristics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

One embodiment described herein formulates the construction of a message characteristic using a query over message content, message metadata or other data. Access to the storage locations for information may be normalized and integrated into the query. Additionally, in some embodiments, the calculation of a characteristic coordinates with the messaging infrastructure so that the system can reason effectively about when information is available and when computation of the characteristic will be complete.

Figure 1:
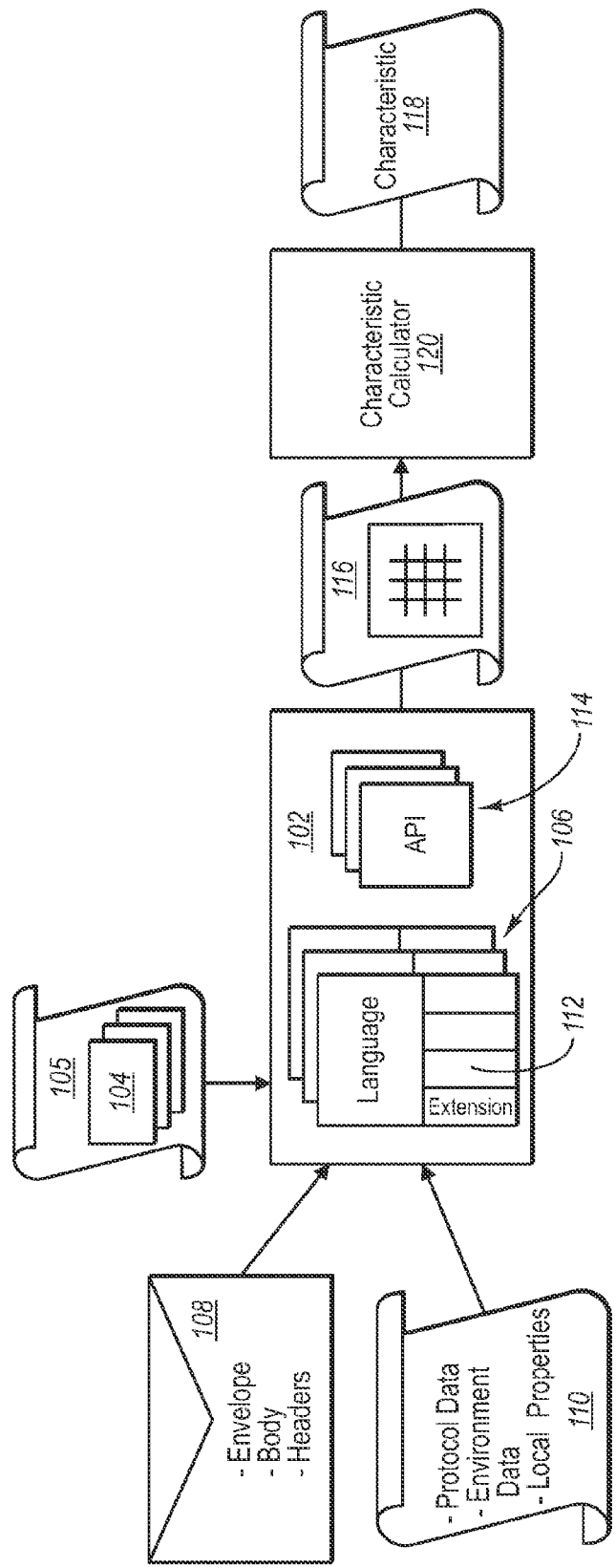
FIG. 1 illustrates a topology for calculating characteristics used to process messages using queries.

Referring now to FIG. 1, an example is illustrated. FIG. 1 illustrates a query engine 102. The query engine 102 includes functionality for processing queries 104, where the queries 104 are queries against various sources of data, such as messages 108 which include message data or non-message data 110 obtainable from other sources. In particular, some embodiments may be practiced such that a message characteristic may be specified using a query over message content, metadata or other information. The query engine may include support for various languages 106. In one specific example, a query may be formulated using XPath expressions as a query language.

Often query languages 106, such as XPath, have native functionality for accessing information in a limited variety of formats and from a limited variety of sources, while not natively including functionality for access to other information. For example, XPath includes native functionality for accessing information in an XML structured data structure, such as a message formatted using XML, but may not include functionality for determining other information from other services. Nonetheless, the query language may be extended by including extensions 112 to include functionality for accessing other services. In the XPath query language, the extensions are referred to as selectors. Additionally, some embodiments may include functionality for normalization of access to different storage locations using extensions to the query language. In some embodiments, normalization of access to different storage locations may use a mutually-agreed upon data structure. Optimization of computing multiple characteristics for the same message may be performed, as will be described in more detail below, by merging queries and executing them simultaneously or in parallel.

As illustrated in FIG. 1, information sources may include a message 108 which includes message data. The message may include information such as envelope data, data in the message body, data in the headers of the message, etc. As noted above, the query engine 102 may include functionality for extracting the message data. For example, in one embodiment, the query engine may include functionality supporting the XPath query language for extracting data from XML formatted messages. Other query languages 106 may also or alternatively be used. Notably, the query engine 102 may also include functionality for invoking various application programming interfaces (APIs) 114. APIs 114 include programmed functionality for interacting with information sources to obtain data from the sources. Notably, the languages 106 may be considered in some respects to be APIs.

FIG. 1 further illustrates non-message data 110. The non-message data may be data from any one of a number of different sources and may include metadata about message data, or other data not directly present in the message data. Metadata associated with data in the message 108 may include information such as protocol data indicating protocols used to send the message 108; environmental data, local properties, time of day, etc.

As noted previously, FIG. 1 illustrates that the query engine 102 performs queries 104 against the data sources. Based on the queries 104, the query engine 102 generates intermediate results 116, which may be instance values of data. The intermediate results 116 may include tables of data or other forms of data. For example, the intermediate results 116 may include information such as a specific time of day (which may or may not be associated with the message 108), a specific protocol used to transmit a message 108, or other information. The intermediate results are typically not unit-less results, but rather represent some specific unit. For example, the intermediate results 116 may represent a time of day unit, a protocol unit, a transport unit, or some other specific unit. Additionally, the intermediate results may be of one or more different data types. For example, the intermediate results may be integers, floating points, strings, or other data types. Additionally, a set of intermediate results may have a mix of different data types. For example, a time may be expressed as one or more integers while a protocol may be expressed as one or more strings. Both the time integers and the protocol strings may be included in the same set of intermediate results 116.

The intermediate results 116 can be used to create a characteristic 118 by a characteristic computation module 120. The characteristic 118 may be, for example, a number calculated using a hash algorithm or other numerical method to calculate a number based on the intermediate results 116. For example, in one embodiment, the characteristic 118 may be a unit-less 128-bit hash number that represents a globally-unique identifier. The characteristic computation module 120 may be embodied using computer hardware and software configured to calculate a hash or other representation, such as for example, a numerical representation.

As will be discussed in more detail below, some embodiments may be practiced where coordination occurs between the computation of a message characteristic 118 and the messaging infrastructure. In particular, a messaging infrastructure may catalog the information that it can potentially supply for a query 104. For example, the messaging infrastructure may be able to provide information regarding transports, information regarding protocols, etc. The messaging infrastructure can promise availability of information at a particular time. In some embodiments, the promise is related to some functionality or performance of some action at the messaging infrastructure. Analysis of a query 104 may be performed before characteristic computation at the characteristic computation module 120 to determine what information will be needed. Optimizations of characteristic computation may be performed so as to perform calculations for a characteristic computation at more convenient times subject to constraints based on information availability As will be discussed in more detail below, some embodiments may be practiced where transformation of information is performed before and/or after a query.

With reference once again to FIG. 1, a more detailed example with specifics is illustrated. Consider a message 108 for which it is desirable to compute a characteristic. The existence of this message 108 can be presupposed without regard to how the message 108 is or was generated. Thus, this could be a message that is being sent, being received, or possibly even created out of thin air without any connection to a messaging operation. The message may be represented in a variety of formats. As an example, consider a message represented using the Simple Object Access Protocol (SOAP) 1.2 format. Such a message will have storage locations for a message envelope, a message body, and any number of message headers. The message may also have associated with it metadata that is not contained within the message envelope, such as local message properties, delivery properties, or information in the ambient environment. This metadata may be represented by the non-message data illustrated at 110. Thus, sources of data may be referred to as either sources of information from within the message or sources of information from outside the message.

To compute a characteristic for the message 108, the available sources of information can be drawn upon. The computation of the characteristic will frequently require only a subset of the available information. This subset is described by a query specification 105 including one or more queries 104. Each query includes an identifier and a query procedure. The query procedure defines how a value is extracted from the available information.

As an example of a query specification 105, in one embodiment, a query procedure is specified using an XPath expression. For example, the message may be a purchase order in the SOAP format, a fragment of which is as follows:

```
<s:Envelope>
    <s:Header>
        ... header data included in the message ...
    </s:Header>
    <s:Body>
        <po:PurchaseOrder purchaseOrderNumber="123">
        ... purchase order data defined by the application ...
        </po:PurchaseOrder>
    </s:Body>
</s:Envelope>
```

The XPath expression "/s:Envelope/s:Body/po:PurchaseOrder/@purchaseOrderNumber" specifies a portion of the message. In the present example, the XPath expression specifies the value of the attribute named purchaseOrderNumber on the element named PurchaseOrder inside the element named Body inside the element named Envelope. In the present example, the XPath expression is named "PONumber" to create an association between the identifier PONumber and the fact resulting from evaluating the XPath expression, i.e. the number 123 which represents a purchase order unit 123.

Upon supplying the query engine 102 with a query specification 105 including queries 104 and necessary information sources, such as the message 108 and/or access to sources that generate the non-message date 110, the query engine 102 computes a table of named query results illustrated in the intermediate results 116.

In the illustrated example, the calculation of the characteristic 118 is defined in terms of the named query results 116 to abstract the calculation process from how information was accessed or organized. New information sources can be added to the system either by unifying them with existing information sources or by extending the query engine with a new access method. For example, the standard XPath language only provides access to message data. The XPath language could be extended with a new function, as illustrated by the extensions 112, to access non-message data.

In one embodiment, the HTTP Referer header is not part of the message data but could be accessed in a similar fashion using the XPath expression "z:GetProtocolData( )/Referer" to specify a portion of the non-message data 110. In this case, the value of the Referer property in the protocol data is not contained within the message. Although the SMTP From header comes from a different information source, it too could be accessed using the GetProtocolData function. Thus, the grouping of information to the same or different access methods can be done at the convenience of the developer.

Figure 2:
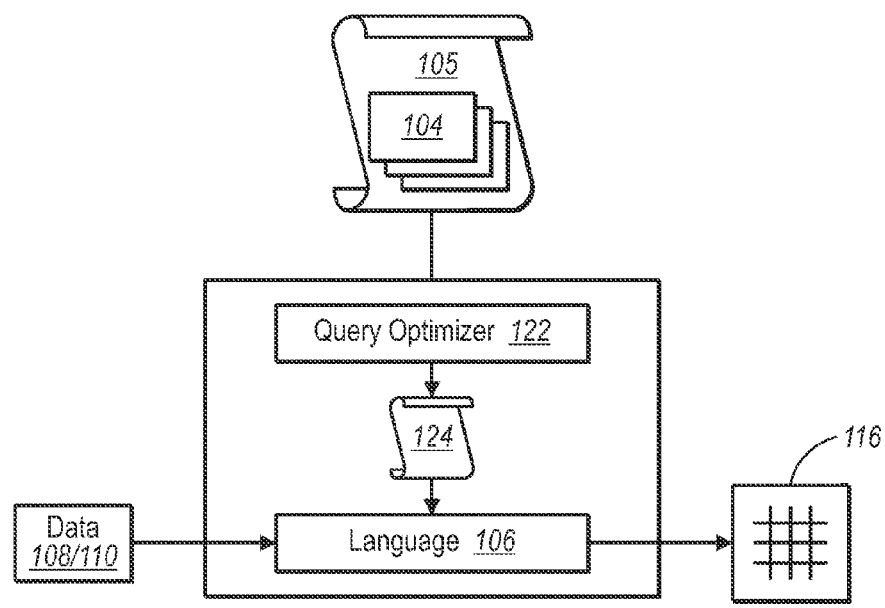
FIG. 2 illustrates components for optimization of queries.

With reference now to FIG. 2, additional details of the query engine 102 will now be discussed, and in particular with respect to optimizing query processing. If multiple queries 104 are performed against the same sources of information such as the message data and non-message data 108/110, it is often possible to perform the collection of queries more efficiently when taken together than one at a time. To do this in one embodiment, the query engine 102 includes a query optimization module 122 which first transforms the original query specification 105 including into an optimized query specification 124 before executing the optimized query specification 124 using the language 106 (API's 114 as illustrated in FIG. 1). The optimized query specification 124, when processed, produces the same table of query results 116.

In one embodiment, the query optimizer 122 of the query engine 102 joins together queries that have common subexpressions so that a single common subexpression is only evaluated once. Thus, the query engine 102 operating on a query specification 105 containing the two queries "/s:Envelope/s:Body/PurchaseOrder1" and "/s:Envelope/s:Body/PurchaseOrder2" may only have to scan through the Envelope and Body elements of the message 108 once to satisfy both queries.

Figure 3:
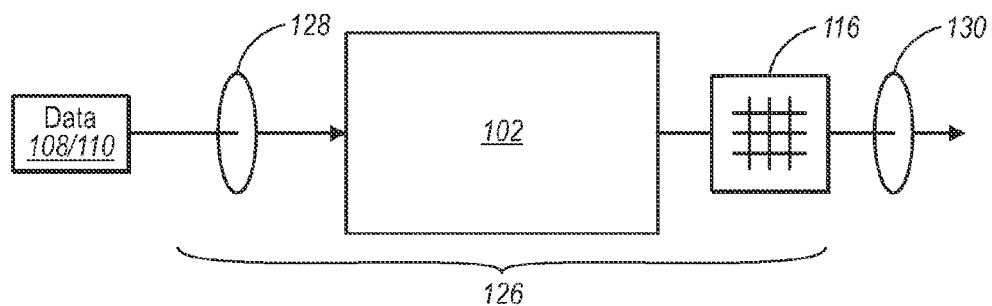
FIG. 3 illustrates transformation of data when calculating characteristics.

Referring now to FIG. 3, additional features of the query engine 102 with respect to transforming data prior to and post processing is illustrated. In the illustrated embodiment, the query engine 102 composes with other components 128 and 130 as part of a processing pipeline 126. These components 128 and 130 act on the inputs and outputs respectively to the engine. One or more transformations may be applied at component 128 to the information sources before being read by the engine and one or more transformation may be applied at component 130 to the query results before the characteristic 118 (see FIG. 1) is calculated. Each fact in an information source and each named query result may have an individually crafted transformation applied to them; or, transformations may be applied to groups of facts or query results.

Applications often have a preferred time for computing a characteristic 118. It is typical for the application to want to compute the characteristic 118 as late as possible or as early as possible depending on the type of decision being made. However, an application may be unable to compute the characteristic 118 until all of the necessary information is available. An example of this conflict occurs when sending a message. It may be desirable to compute the characteristic as early as possible so that the characteristic is known before any responses to sending the message are observed. However, the information necessary to compute the characteristic may not be available until the message is partially or fully sent. An example of information that is not available until very late is a message identifier that is assigned by the delivery system when the message is written onto the wire.

Figure 4:
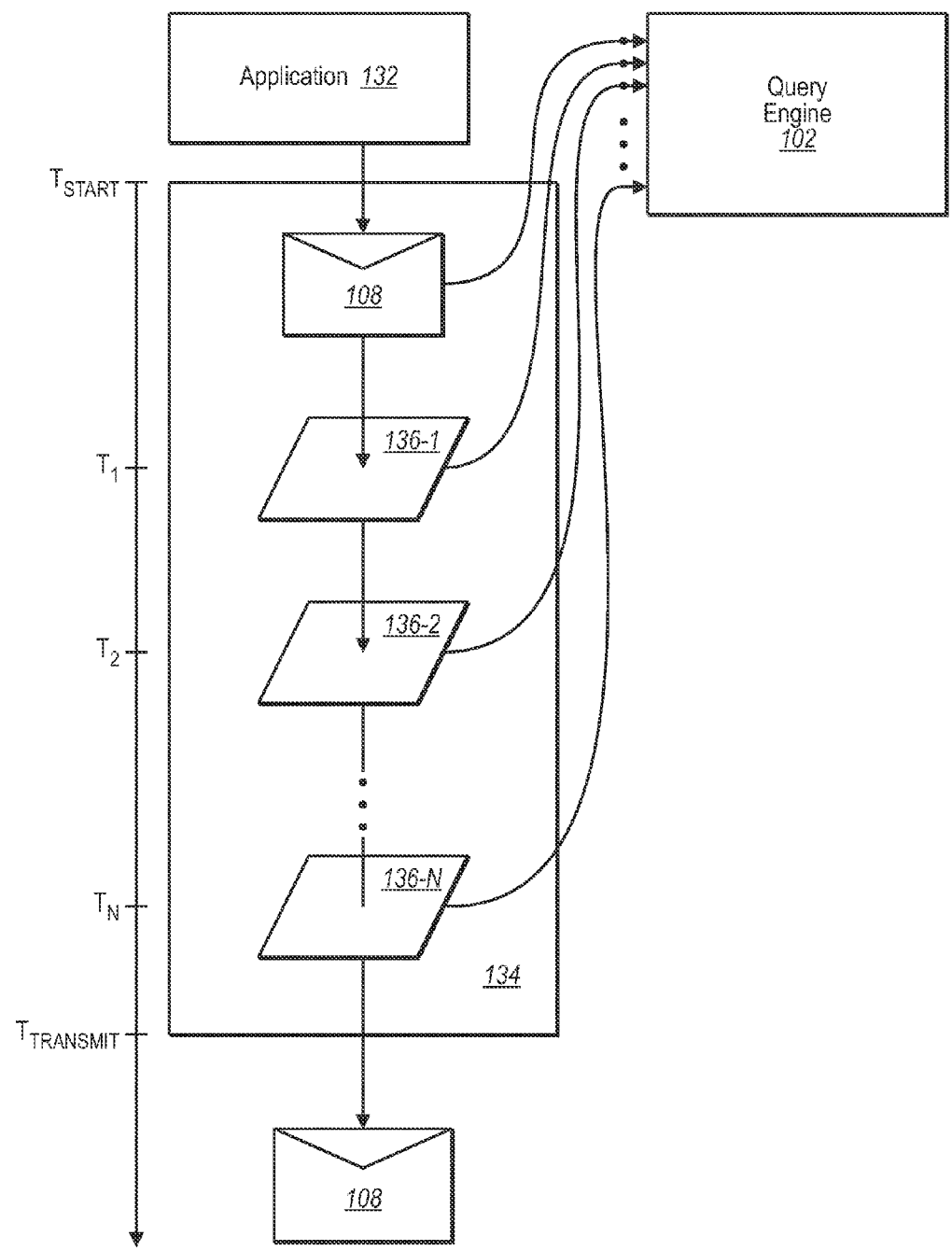
FIG. 4 illustrates a messaging infrastructure supplying information to a query engine after the information becomes available to facilitate calculating a characteristic.

Referring now to FIG. 4, an example of one embodiment that addresses these concerns is illustrated. To reason about a conflict, what information will be used by the characteristic computation and when that information will be available should be known. Prior to the message 108 being sent by an application 132, a messaging infrastructure 134 is introspected to identify the variety of information that this particular configuration will generate. The messaging infrastructure 134 may also make one or more statements about when each fact will be available. Statements may be promises that the facts will be available at a particular time or stage of processing. Also prior to the message 108 being sent, the query specification 105 (see FIG. 1) may be introspected to determine the variety of information that this particular query specification 105 will request.

FIG. 4 illustrates the messaging infrastructure 134 against a timeline axis T. The timeline axis T illustrates increasing time in the down direction. At $T_{Start}$, the message 108 is sent from the application 132 to the messaging infrastructure 134. In some embodiments, about the time the message 108 is sent, the list of information identifiers that will be required by the queries 104 in the query specification 105 is associated with the message 108. Notably, embodiments may be implemented to associate the list of information identifiers prior to the message 108 being sent, at the time the message 108 is sent, or in some embodiments after the message 108 is sent. Additionally, the message 108 is associated with a callback that invokes the query engine 102 and characteristic computation module 120 (see FIG. 1). Components 136-1-136-N may act on the message 108. As components, referred to here generally as 136 and specifically by 136-X where X is a number identifying a particular component, act on the message 108, they conceptually add checkmarks to the list of information identifiers that will be required by the queries 104 as each identified fact becomes available. In one embodiment, a fact becomes available when it is possible to execute a specific process that results in the value of the fact. This process might simply return a pre-calculated value for the fact, or alternatively might require performing additional calculations. Thus, although a fact may be made available to query engine 102 at a particular time, the value of the fact may not be known in a definite sense until query engine 102 requests the value of the fact at a later time, if query engine 102 ever chooses to do so. Once all of the identified information is available the callback can be invoked to complete the characteristic computation. In the example illustrated, FIG. 4 shows information about the message 108 being made available to the query engine 102. At time $T_1$, information provided by component 136-1 is made available to the query engine 102. At time $T_2$, information provided by component 136-2 is made available to the query engine 102. At time $T_N$, information provided by component 136-N (which signifies that any number of components 136 may be implemented in the messaging infrastructure 134) is made available to the query engine 102.

The timeline axis T includes a time $T_{Transmit}$ representing the message 108 being transmitted out of the messaging infrastructure 134, such as by transmitting the message onto the communication wire. The communication wire may be any one of a different number of media including network cables or wireless transport media. The completion of the computation may take place earlier or later than the message being transmitted depending on the promises made by the components 136.

In one embodiment, the completion of the callback is used to solve races between sending and receiving messages. The application 132 refrains from processing any received messages that might depend on the characteristic 118 of a previously sent message 108 until all of those characteristics have been computed.

Figure 5:
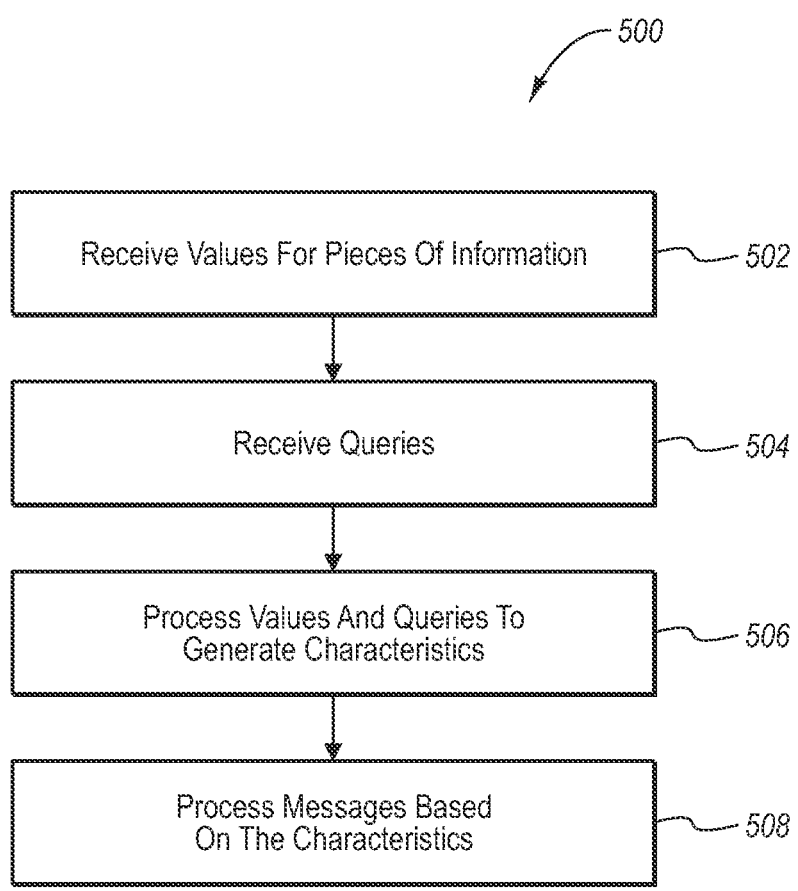
FIG. 5 illustrate a method of processing messages based on a characteristic.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed. FIG. 5 illustrates a method 500 of processing messages based on a characteristic derived from at least one of information in messages, metadata about messages, or other information external to messages. The method includes receiving one or more values for one or more pieces of information (act 502). At least one of the values for one or more pieces of information may be associated with a first message. The method 500 further includes receiving one or more queries (act 504). The queries may specify one or more of the one or more pieces of information. For example, FIG. 1 illustrates a query specification 105 including queries 104 that may be used to obtain values from the information in the message 108 and the non-message data 110.

The method 500 includes processing the one or more values for the one or more pieces of information in conjunction with the one or more queries to create one or more normalized characteristics for the first message (act 506). The one or more normalized characteristics for the first message are in a same format irrespective of the format of the pieces of information. For example, the one or more normalized characteristics may always be in the format of a 128-bit unit-less number that represents a globally unique identifier. Other representations may be used alternatively.

The method 500 further includes processing messages based on at least one of the one or more normalized characteristics (act 508). Notably, the messages processed may be messages for which the characteristics were calculated. In alternative embodiments, the messages may be other messages. For example, the method 500 may include storing the one or more normalized characteristics for the first message and using the one or more normalized characteristics for processing one or more different messages. For example, the characteristic(s) may be calculated for a message that is sent while the characteristic(s) are used to process messages sent in reply to the first message.

Embodiments of the method 500 may further include creating an optimized query from one or more of the received queries. In some of these embodiments, processing the one or more values for the one or more pieces of information in conjunction with the one or more queries to create one or more normalized characteristics for the first message (act 506) includes processing the optimized query. Creating an optimized query may include determining a portion of a query that is common to two or more queries and when processing a query, merging common elements of the query to reduce overall processing. In an alternative embodiment, creating an optimized query may include performing parallel execution on two or more queries.

As noted and illustrated at 116 of FIG. 1, the method 500 may be performed where processing the one or more values for the one or more pieces of information in conjunction with the one or more queries to create one or more normalized characteristics for the first message (act 506) includes computing one or more intermediate results and calculating the one or more normalized characteristics from the intermediate results. The intermediate results may have units associated with them even when the one or more normalized characteristics do not. For the example, the intermediate results may include results in time units, network address units, etc. In some embodiments, various transformations to data may occur, as illustrated at 128 and 130 of FIG. 3. For example, the method 500 may be practiced to include transforming one or more of the values for the one or more pieces of information prior to computing the one or more intermediate results. Additionally or alternatively, the method 500 may further include transforming one or more of the values for the one or more pieces of information after computing the one or more intermediate results and prior to calculating the one or more normalized characteristics from the intermediate results.

As noted, some embodiments may be directed to environments where information is not immediately available to calculate a characteristic. Thus, some embodiments include functionality for handling these situations. In particular, the method 500 may be practiced to include analyzing the one or more queries to determine what information is needed. A promise is received for the information at a particular time for the information needed. In this example, the act of processing the one or more values for the one or more pieces of information in conjunction with the one or more queries to create one or more normalized characteristics for the first message (act 506) is performed after the information is received. The particular time specified in the promise may be a present time, after a message is sent from a messaging infrastructure, or any other appropriate time.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment which processes messages, and wherein the message processing is based on one or more characteristics of each message derived from different classes of information formatted differently from one another, one class of information being information contained within the message itself, and another class of information being other information external to the message, a computer-implemented method of deriving one or more unitless characteristics of a message to facilitate processing the message based on the derived one or more characteristics, wherein the method comprises performing at a processor, the following:

receiving a first value, the first value associated with a first message, comprising information contained within the message, and representing a specific first unit;

receiving a second value associated with the first message, comprising information from a source external to the message, and representing a specific second unit which is different from the specific first unit;

receiving one or more queries, the queries specifying at least the first and second received values;

at a characteristic computation module configured to compute one or more characteristics for a message from intermediate results, using the one or more queries to process the first and second values to create one or more normalized characteristics for the first message, the one or more normalized characteristics for the first message being in a unitless format which is the same format irrespective of the format of the first and second values and irrespective of the specific units of the first and second values, at least one of the created one or more normalized characteristics being a unitless number representing a globally unique identifier;

processing the first message based on at least one of the one or more of the derived normalized characteristics; and storing within the computing environment the one or more normalized characteristics derived for the first message; and processing within the computing environment a second message based on at least one of the one or more of the stored normalized characteristics derived for the first message.

2. The method of claim 1, further comprising creating an optimized query from one or more of the received queries, and wherein using the one or more queries to process the first and second values comprises using the optimized query to perform said processing of the first and second values.

3. The method of claim 2, wherein creating an optimized query comprises:
   determining a portion of a query that is common to two or more queries; and
   when processing a query, merging common elements of the query to reduce overall processing.

4. The method of claim 2, wherein creating an optimized query comprises performing parallel execution on two or more queries.

5. The method of claim 1, wherein using the one or more queries to process the first and second values comprises:
   evaluating the one or more queries to obtain one or more intermediate results and;
   calculating the one or more normalized characteristics from the intermediate results.

6. The method of claim 5, further comprising transforming one or more of the received values prior to computing the one or more intermediate results.

7. The method of claim 5, further comprising transforming one or more of the received values after computing the one or more intermediate results and prior to calculating the one or more normalized characteristics from the intermediate results.

8. The method of claim 1 wherein the one or more queries comprise one or more Xpath queries.

9. The method of claim 1, wherein the one or more characteristics are one or more unique identifiers.

10. In a computing environment which processes messages, and wherein the message processing is based on one or more characteristics of each message derived from different classes of information formatted differently from one another, one class of information being information contained within the message itself, and another class of information being other information external to the message, an improved computer-implemented method of deriving one or more unitless characteristics of a message to facilitate processing the message based on the derived one or more characteristics, comprising:
   identifying at a processor at least two values for at least two types of information associated with a first message, at least one value comprising information contained within the message, and representing a specific first unit, and at least one other value comprising information from a source external to the message, and representing a specific second unit which is different from the specific first unit;
   receiving at the processor one or more queries which specify one or more of the identified values to be extracted for the at least two types of information;
   at a characteristic computation module configured to compute one or more characteristics for a message from intermediate results, the processor using the one or more queries to extract and then process the at least two values to derive from the processed values one or more unitless normalized characteristics for the first message, the one or more normalized characteristics for the first message being in a unitless format which is the same format irrespective of the format of the two types of information and irrespective of the specific units of the values from which the normalized characteristics for the first message were derived, at least one of the created one or more normalized characteristics being a unitless number representing a globally unique identifier;
   storing the one or more normalized characteristics derived for the first message; and
   the processor then processing a second message based on at least one of the one or more of the stored normalized characteristics derived for the first message.

11. The method of claim 10, further comprising:
   analyzing the one or more queries to determine information that is needed for a particular normalized characteristic;
   receiving a promise for the needed information that the needed information will be available at a particular time; and
   wherein using the one or more queries to extract and then process the at least two values is performed after the needed information is received.

12. The method of claim 11, wherein the promise is that the needed information will be immediately available.

13. The method of claim 11, wherein the promise is that the needed information will be available once the first message is sent from a messaging infrastructure.

14. The method of claim 11, wherein the promise is that the needed information will be available after a particular time or date.

15. The method of claim 10, wherein the one or more normalized characteristics are one or more unique identifiers.

16. The method of claim 10, wherein the one or more queries comprise one or more Xpath queries.

17. The method of claim 10, wherein using the one or more queries to extract and then process the at least two values to create one or more normalized characteristics for the first message comprises:
   evaluating the one or more queries to obtain one or more intermediate results and;
   calculating the one or more normalized characteristics from the intermediate results.

18. The method of claim 17, wherein the one or more intermediate results comprise results extracted from data associated with information contained within or with the first message itself.

19. The method of claim 17, wherein the one or more intermediate results comprise results extracted from data based on the information external to the first message.

20. A computer program product comprising one or more physical computer storage hardware devices having thereon one or more computer-executable instructions which, when executed in a computing environment which processes how messages are used and/or handled, and wherein the message processing is based on one or more characteristics of each message derived from different classes of information formatted differently from one another, one class of information being information contained within the message itself, and another class of information being other information external to the message, and
   when instantiated in the one or more computer storage devices, the computer program product creating within the computing environment a computer architecture comprising:

a query engine module which supports query languages from at least two different sources, and which includes one or more application program interfaces (API's) that are invoked to obtain data from one or more of those sources;

a query optimizer module configured to optimize queries to reduce processing by the query engine module when calculating intermediate results; and a characteristic computation module configured to compute one or more characteristics for a message from the intermediate results; and wherein the computer-implemented instructions implement within the computer architecture an improved computer-implemented method of deriving one or more characteristics of a message to facilitate processing the message based on the derived one or more characteristics, and the computer-implemented method comprising:

receiving at the query engine module at least two values for at least two types of information associated with a first message, at least one value comprising information contained within the message, and representing a specific first unit, and at least one other value comprising information from a source external to the message, and representing a specific second unit which is different from the specific first unit;

receiving at the query engine module one or more queries, the queries specifying one or more of the one or more received values;

using the one or more queries at the query engine module to process the at least two values to calculate one or more intermediate results for the first message;

at the query optimizer module optimizing the one or more queries to reduce processing by the query engine module when calculating the one or more intermediate results;

at the characteristic computation module using the one or more intermediate results to calculate one or more normalized characteristics for the first message, the one or more normalized characteristics for the first message being in a unitless format which is the same format irrespective of the format of the two types of information and irrespective of the specific units of the values from which the normalized characteristics for the first message were derived, at least one of the created one or more normalized characteristics being a unitless number representing a globally unique identifier;

storing within the computing environment the one or more normalized characteristics derived for the first message; and processing within the computing environment a second message based on at least one of the one or more of the stored normalized characteristics derived for the first message.

\* \* \* \* \*